(12) United States Patent
Yang

(10) Patent No.: US 12,598,284 B2
(45) Date of Patent: Apr. 7, 2026

(54) IMAGE CORRECTION METHOD AND DISPLAY MODULE

(71) Applicant: AUO Corporation, Hsinchu City (TW)

(72) Inventor: Hao-Xuan Yang, Hsinchu City (TW)

(73) Assignee: AUO CORPORATION, Hsinchu City (TW)

( * ) Notice: Subject to any disclaimer, the term of this patent is extended or adjusted under 35 U.S.C. 154(b) by 0 days.

(21) Appl. No.: 18/950,215

(22) Filed: Nov. 18, 2024

(65) Prior Publication Data

US 2026/0067443 A1 Mar. 5, 2026

(30) Foreign Application Priority Data

Sep. 4, 2024 (TW) ................................ 113133537

(51) Int. Cl.
*H04N 13/327* (2018.01)
*H04N 13/122* (2018.01)
(Continued)

(52) U.S. Cl.
CPC ......... *H04N 13/327* (2018.05); *H04N 13/122* (2018.05); *H04N 13/144* (2018.05);
(Continued)

(58) Field of Classification Search
CPC ............ G06V 20/597; B60R 2300/205; B60R 2300/308; B60K 35/81; B60K 2360/21;
(Continued)

(56) References Cited

U.S. PATENT DOCUMENTS

2009/0201363 A1* 8/2009 Grossmann .......... H04N 13/305 348/E13.001
2019/0082168 A1 3/2019 Lee et al.
(Continued)

FOREIGN PATENT DOCUMENTS

CN 105404011 A 3/2016
CN 109495734 A 3/2019
(Continued)

OTHER PUBLICATIONS

Rattarom et al. "Interpolation based polynomial regression for eye gazing estimation: a comparative study," 2015 12th International Conference on Electrical Engineering/Electronics, Computer, Telecommunications and Information Technology (ECTI-CON), Hua Hin, Thailand, 2015, pp. 1-4. (Year: 2015).*

*Primary Examiner* — Nathnael Aynalem
(74) *Attorney, Agent, or Firm* — WPAT, PC

(57) ABSTRACT

An image correction method include providing a left eye image and a right eye image; providing a left eye gazing position and a right eye gazing position; dewarping the left eye image according to the left eye gazing position and dewarping the right eye image according to the right eye gazing position to acquire a dewarped left eye image and a dewarped right eye image; correcting a brightness of the dewarped left eye image according to the left eye gazing position and correcting a brightness of the dewarped right eye image according to the right eye gazing position; and 3D rendering the dewarped left eye image and the dewarped right eye image to acquire a stereoscopic left eye image and a stereoscopic right eye image.

15 Claims, 8 Drawing Sheets

(51) Int. Cl.
*H04N 13/144* (2018.01)
*H04N 13/305* (2018.01)
*H04N 13/383* (2018.01)

(52) U.S. Cl.
CPC ......... *H04N 13/305* (2018.05); *H04N 13/383* (2018.05); *H04N 2213/002* (2013.01)

(58) Field of Classification Search
CPC .. B60K 35/231; B60K 35/235; B60K 35/234; B60K 35/23; B60K 35/232; B60K 35/233; B60K 2370/149; B60W 2540/225; G05B 2219/35503; G02B 27/01; G02B 27/0093; G06F 3/012; G06F 3/013; H04N 13/327; H04N 13/122; H04N 13/144; H04N 13/302; H04N 13/305; H04N 13/383; H04N 2213/002
USPC .................................................. 348/54, 148
See application file for complete search history.

(56) References Cited

U.S. PATENT DOCUMENTS

| | | | | |
|---|---|---|---|---|
| 2020/0234408 | A1* | 7/2020 | Melakari | G06T 3/4053 |
| 2021/0012531 | A1* | 1/2021 | Ollila | G06T 7/50 |
| 2021/0271076 | A1* | 9/2021 | Ono | B60K 35/23 |
| 2021/0341305 | A1 | 11/2021 | Lee | |

FOREIGN PATENT DOCUMENTS

| | | | |
|---|---|---|---|
| CN | 209542964 | U | 10/2019 |
| CN | 112130325 | A | 12/2020 |
| CN | 117130162 | A | 11/2023 |
| TW | 202121896 | A | 6/2021 |

* cited by examiner

250

240

230

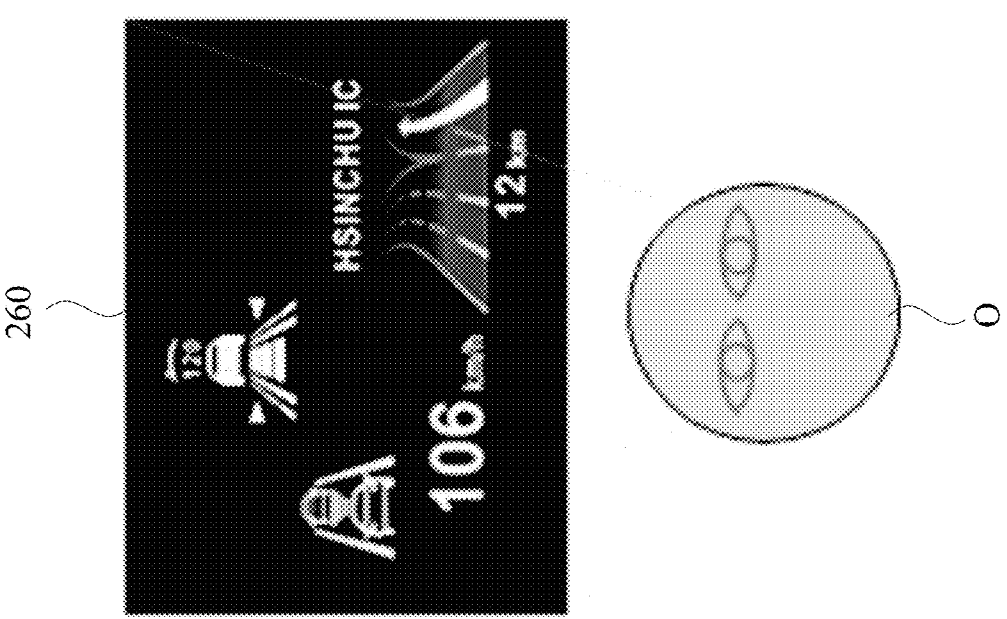
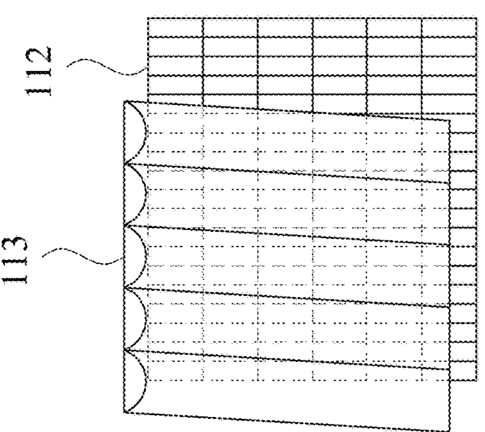
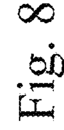
Fig. 8
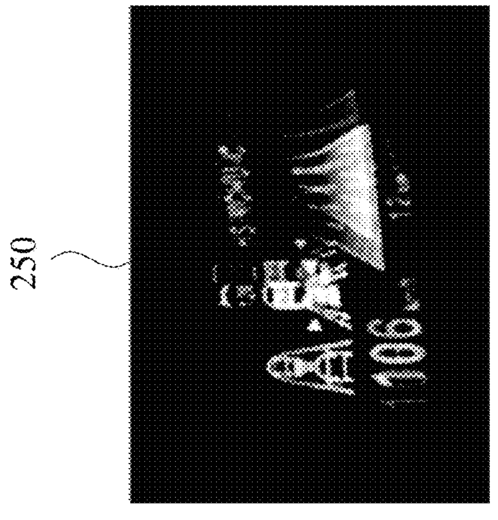

IMAGE CORRECTION METHOD AND DISPLAY MODULE

CROSS-REFERENCE TO RELATED APPLICATION

This application claims priority to Taiwan Application Serial Number 113133537, filed Sep. 4, 2024, which is herein incorporated by reference.

BACKGROUND

Technical Field

The present disclosure relates to an image correction method and a display module.

Description of Prior Art

In the field of vehicle displays, head-up displays (HUDs) occupy a very important position. General AR-HUDs (augmented reality-head-up displays), due to their large angles of view and large magnifications, easily have problems that two eye images cannot be merged, sunlight easily penetrate images, and the overall volume is too large.

In this regard, a general solution is to use a 3D head-up display (3D HUD) to achieve the scaling of magnifications by adjusting a distance between stereoscopic images, so that the overall volume of a projection lens base can be reduced. However, images on the 3D HUD will have the situation of warping, and since a cylindrical lens array of the 3D HUD may not be designed together with a projection lens set at the time of design, brightnesses perceived by the left and right eyes may be different, thereby causing vertigo.

SUMMARY

One technical aspect of the present disclosure is an image correction method.

According to an embodiment of the present disclosure, an image correction method comprises providing a left eye image and a right eye image; providing a left eye gazing position and a right eye gazing position; dewarping the left eye image according to the left eye gazing position and dewarping the right eye image according to the right eye gazing position to acquire a dewarped left eye image and a dewarped right eye image; correcting a brightness of the dewarped left eye image according to the left eye gazing position and correcting a brightness of the dewarped right eye image according to the right eye gazing position; and 3D rendering the dewarped left eye image and the dewarped right eye image to acquire a stereoscopic left eye image and a stereoscopic right eye image.

In an embodiment of the present disclosure, the dewarping the left eye image according to the left eye gazing position satisfies $$u'(u,v,x,y) = p_{u00} + p_{u10}u + p_{u01}v + p_{u20}u^2 + p_{u11}uv + p_{u02}v^2$$

$$v'(u,v,x,y) = p_{v00} + p_{v10}u + p_{v01}v + p_{v20}u^2 + p_{v11}uv + p_{v02}v^2$$

$$p_{u,v,i,j} = \sum_{n=0}^{m}\sum_{o=0}^{n} p_{o(n-o)}x^o y^{n-o},\ o, n, m \in N$$

wherein (u,v) is the coordinates of the left eye image, (u',v') is the coordinates of the dewarped left eye image, (x,y) is the coordinates of the left eye gazing position, and $p_{o(n-o)}$ is a polynomial coefficient.

In an embodiment of the present disclosure, the image correction method further comprises providing an image; and segmenting the image into the left eye image and the right eye image.

In an embodiment of the present disclosure, the providing the left eye gazing position and the right eye gazing position is implemented by using an eye tracking camera.

In an embodiment of the present disclosure, the image correction method further comprises displaying the stereoscopic left eye image and the stereoscopic right eye image via a display module.

In an embodiment of the present disclosure, the display module has a cylindrical lens array configured to separate the stereoscopic left eye image from the stereoscopic right eye image.

Another technical aspect of the present disclosure is a display module.

According to an embodiment of the present disclosure, a display module comprises an image generation unit, a reflection unit, and an eye tracking camera. The image generation unit comprises a display, a cylindrical lens array and a computing unit. The cylindrical lens array is located on the display. The computing unit is electrically connected to the display. The reflection unit is located on the image generation unit. The eye tracking camera is located between the image generation unit and the reflection unit, electrically connected to the computing unit, and configured to provide a left eye gazing position and a right eye gazing position, wherein the computing unit is configured to dewarp a left eye image according to the left eye gazing position and dewarp a right eye image according to the right eye gazing position to acquire a dewarped left eye image and a dewarped right eye image.

In an embodiment of the present disclosure, the dewarping the left eye image according to the left eye gazing position satisfies $$u'(u,v,x,y) = p_{u00} + p_{u10}u + p_{u01}v + p_{u20}u^2 + p_{v11}uv + p_{u02}v^2$$

$$v'(u,v,x,y) = p_{v00} + p_{v10}u + p_{v01}v + p_{v20}u^2 + p_{v11}uv + p_{v02}v^2$$

$$p_{u,v,i,j} = \sum_{n=0}^{m}\sum_{o=0}^{n} p_{o(n-o)}x^o y^{n-o},\ o, n, m \in N$$

wherein (u,v) is the coordinates of the left eye image, (u',v') is the coordinates of the dewarped left eye image, (x,y) is the coordinates of the left eye gazing position, and $p_{o(n-o)}$ is a polynomial coefficient.

In an embodiment of the present disclosure, the display module further comprises a projection lens set. The projection lens set is located above the display.

In an embodiment of the present disclosure, the display module further comprises an illumination module. The illumination module is located below the display.

In the above embodiments of the present disclosure, since the left eye image is dewarped according to the left eye gazing position and the right eye image is dewarped according to the right eye gazing position and the brightnesses are corrected according to the left eye gazing position and the right eye gazing position, a brightness imbalance caused by a difference in the left and right eye gazing positions can be corrected; and the parameters for dewarping can also modified in real time according to current left and right eye gazing positions, so that the display module can achieve a better display effect.

BRIEF DESCRIPTION OF THE DRAWINGS

Aspects of the present disclosure may be best understood from subsequent embodiments when read in conjunction with the drawings. Note that, in accordance with standard practices in this industry, various features are not drawn to scale. In fact, the dimensions of the various features may be arbitrarily increased or decreased for clarity of argument.

FIG. 7 and FIG. 8 show schematic diagrams of an intermediate process of the image correction method in FIG. 3.

DETAILED DESCRIPTION

Figure 1:
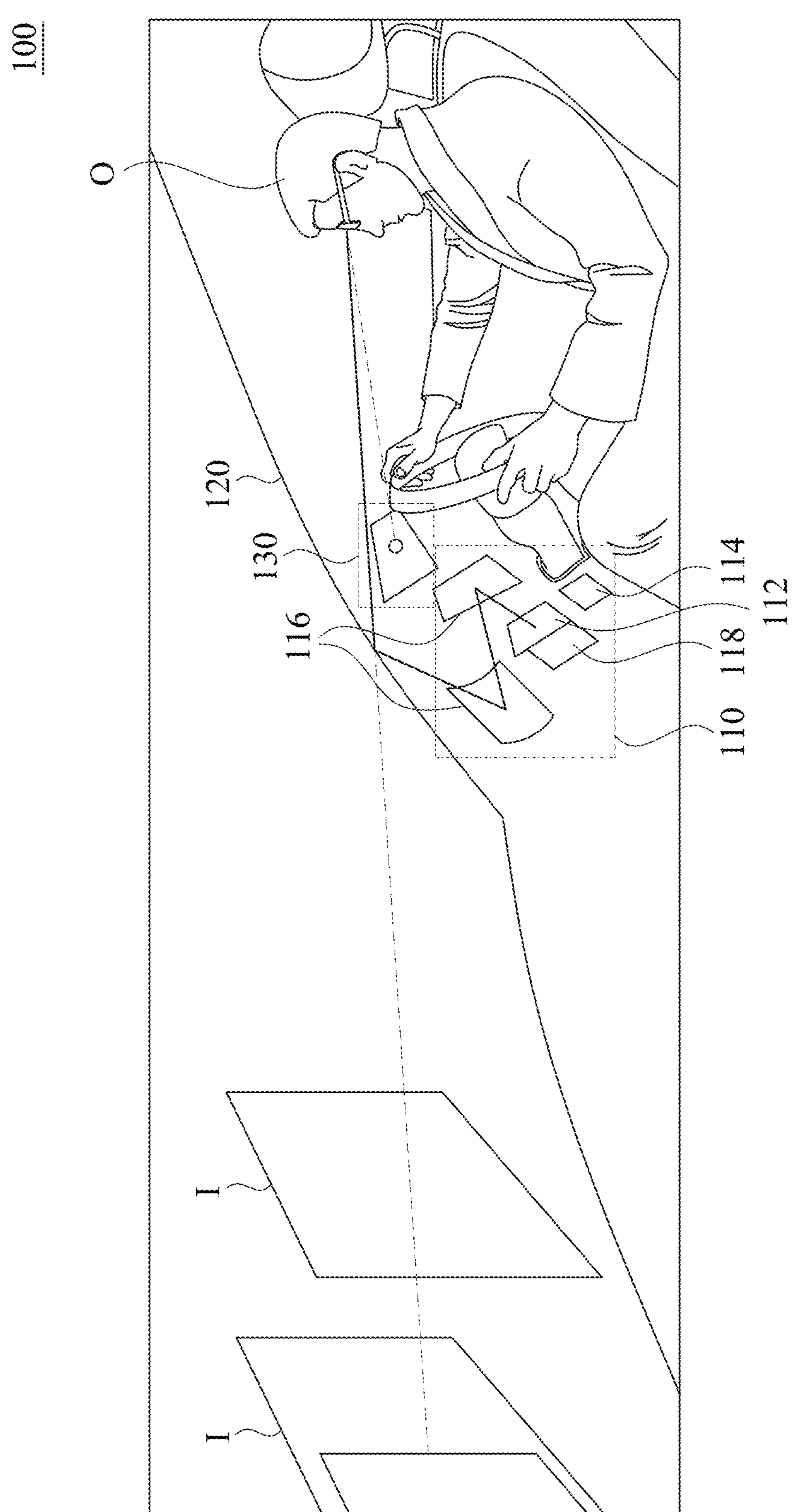
FIG. 1 shows a schematic diagram of a display module according to an embodiment of the present disclosure.

The following embodiments of the present disclosure provide a number of different embodiments, or examples, for implementing different characteristics of the subject matter provided. Specific examples of components and arrangements are described below to simplify the case. Obviously, these examples are examples only and are not intended as limitations. In addition, component symbols and/or letters may be repeated in each example of the case. Such repetition is intended for the purpose of simplicity and clarity, and does not itself specify the relationship between the various embodiments and/or configurations discussed.

Spatial relative terms such as “below”, “under”, “lower”, “above” and “upper” may be used for descriptive purposes herein to describe the relation of one element or feature to another as shown in the drawings. The spatial relative terms are intended to encompass different orientations of devices in use or operation other than those shown in the drawings. The devices may be oriented in other ways (to rotate 90 degrees or otherwise) and spatial relative descriptors used herein may be interpreted accordingly.

Figure 2:
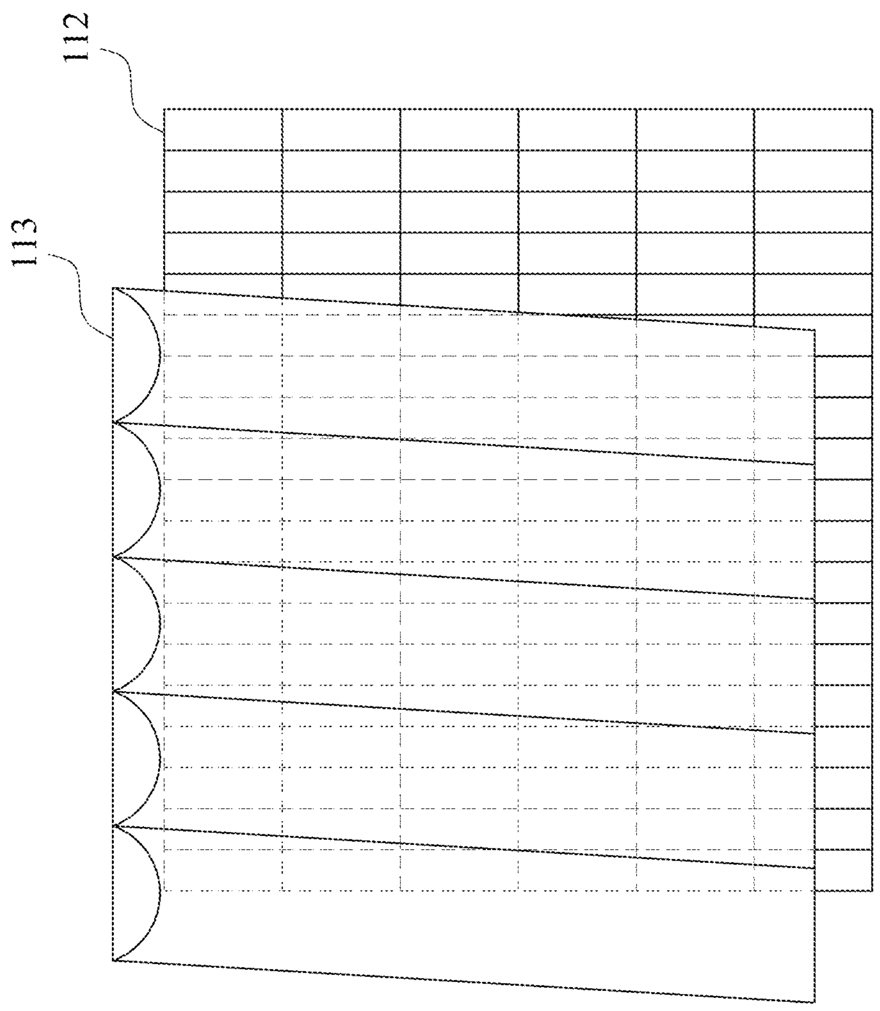
FIG. 2 shows a partial enlarged view of a display and a cylindrical lens array in FIG. 1.

FIG. 1 shows a schematic diagram of a display module 100 according to an embodiment of the present disclosure. FIG. 2 shows a partial enlarged view of a display 112 and a cylindrical lens array 113 in FIG. 1. Referring to FIGS. 1 and 2, a display module 100 includes an image generation unit 110, a reflection unit 120, and an eye tracking camera 130. The image generation unit 110 includes a display 112, a cylindrical lens array 113 and a computing unit 114. The cylindrical lens array 113 is located on the display 112. The computing unit 114 is electrically connected to the display. The reflection unit 120 is located on the image generation unit 110. The eye tracking camera 130 is located between the image generation unit 110 and the reflection unit 120, electrically connected to the computing unit 114, and configured to provide a left eye gazing position and a right eye gazing position. In the present embodiment, the display module 100 further includes a projection lens set 116 and an illumination module 118. The projection lens set 116 is located above the display 112. The illumination module 118 is located below the display 112. In some embodiments, the display module 100 may be a vehicle-mounted head-up display, a stereoscopic display, or the like, but the present disclosure is not limited thereto.

In particular, the eye tracking camera 130 is configured to provide the left eye gazing position and the right eye gazing position for the computing unit 114 to compute and perform image processing. In some embodiments, the image processing includes dewarping, 3D rendering, brightness correction, etc., but the present disclosure is not limited thereto. Processed images are then shown to an observer O via the display 112, so that the observer O can see the images I with different depths in front of the reflection unit. In FIG. 1, only three images I with different depths are depicted, but more or less images I can be formed in practice.

Figure 3:
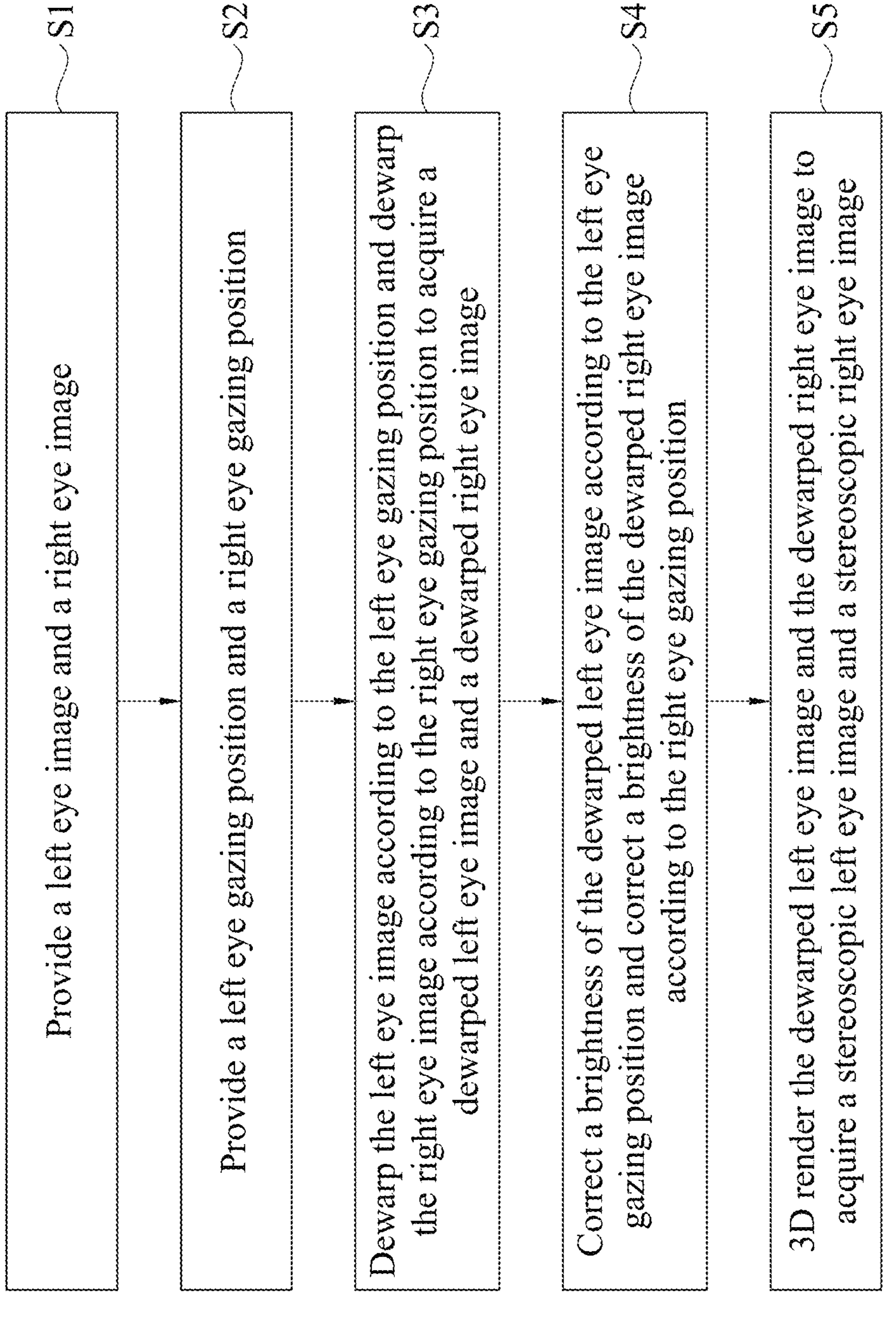
FIG. 3 shows a flow diagram of an image correction method according to an embodiment of the present disclosure.

FIG. 3 shows a flow diagram of an image correction method according to an embodiment of the present disclosure. Referring to FIG. 3, an image correction method includes the following steps: firstly, at step S1, providing a left eye image and a right eye image; then at step S2, providing a left eye gazing position and a right eye gazing position; at step S3, dewarping the left eye image according to the left eye gazing position and dewarping the right eye image according to the right eye gazing position to acquire a dewarped left eye image and a dewarped right eye image; at step S4, correcting a brightness of the dewarped left eye image according to the left eye gazing position and correcting a brightness of the dewarped right eye image according to the right eye gazing position; and finally, at step S5, 3D rendering the dewarped left eye image and the dewarped right eye image to acquire a stereoscopic left eye image and a stereoscopic right eye image.

In some embodiments, the image correction method is not limited to steps S1-S5 above, for example, in some embodiments, other steps may be further included between two adjacent steps, or other steps may be further included before step S1, or other steps may be further included after step S5. At least the above steps are described in the following description.

Figure 4:
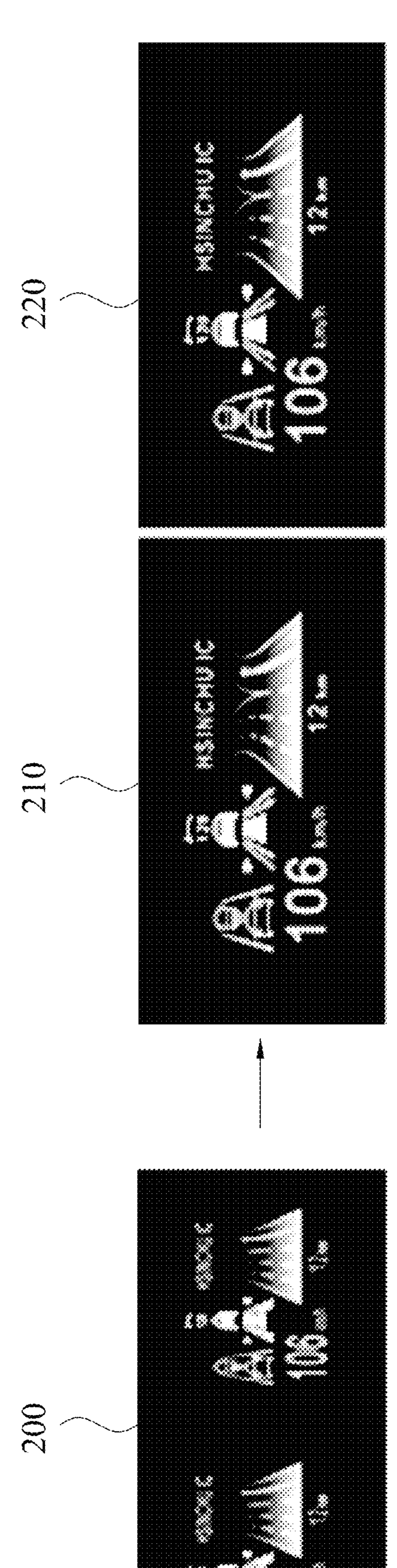
FIG. 4 and FIG. 5 show schematic diagrams of an intermediate process of the image correction method in FIG. 3.
Figure 4:
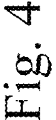
Figure 5:
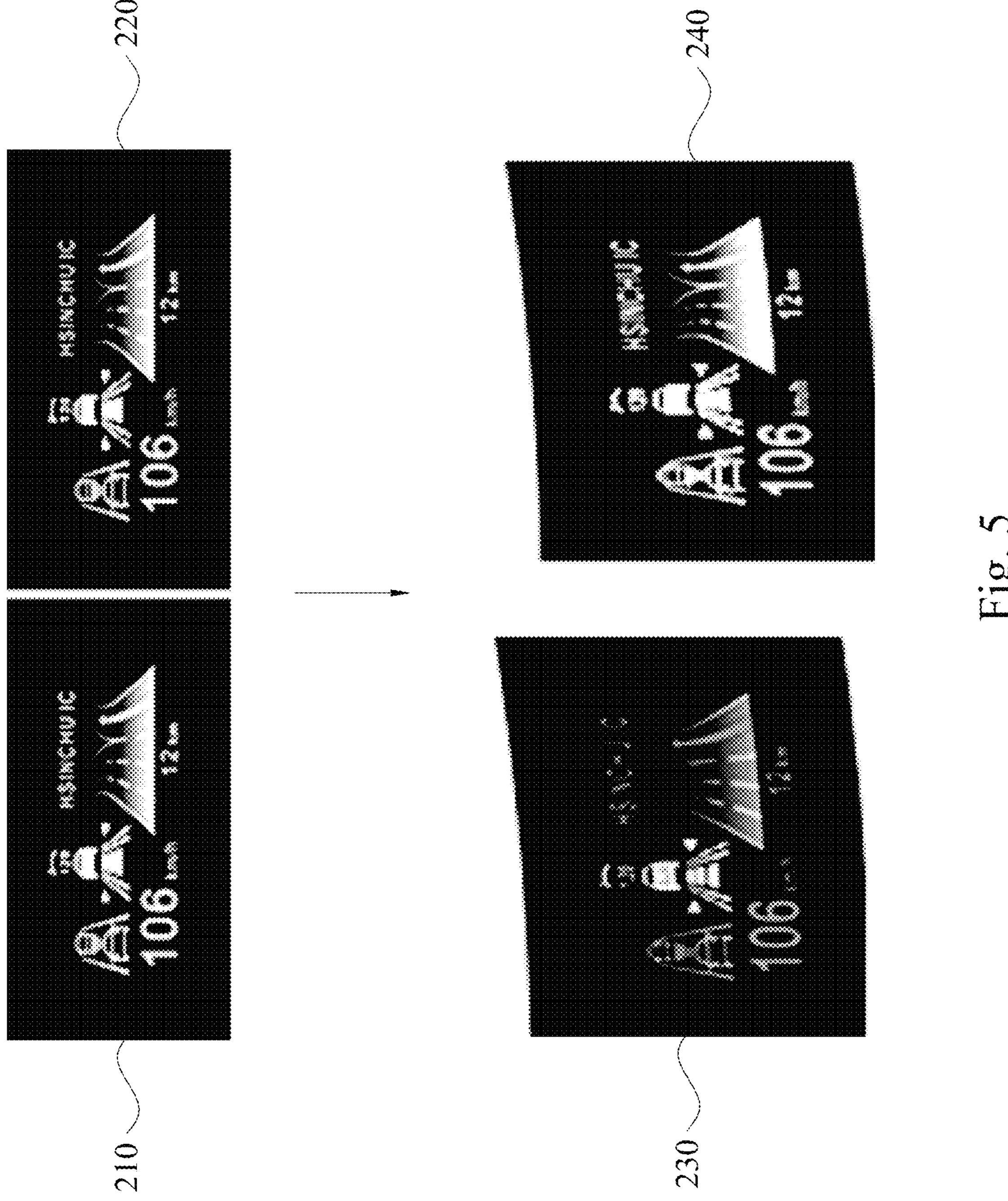

FIG. 4 and FIG. 5 show schematic diagrams of an intermediate process of the image correction method in FIG. 3. Referring to FIG. 4, first of all, a computing unit 114 (see FIG. 1) will provide a complete image 200, the left and right sides of which will have same information, so the image will be cut once to form a left eye image 210 and a right eye image 220. At this time, all objects on the left eye image 210 and the right eye image 220 are identical in depth, that is, the two images are still planar images, and have no difference in depth.

Figure 6:
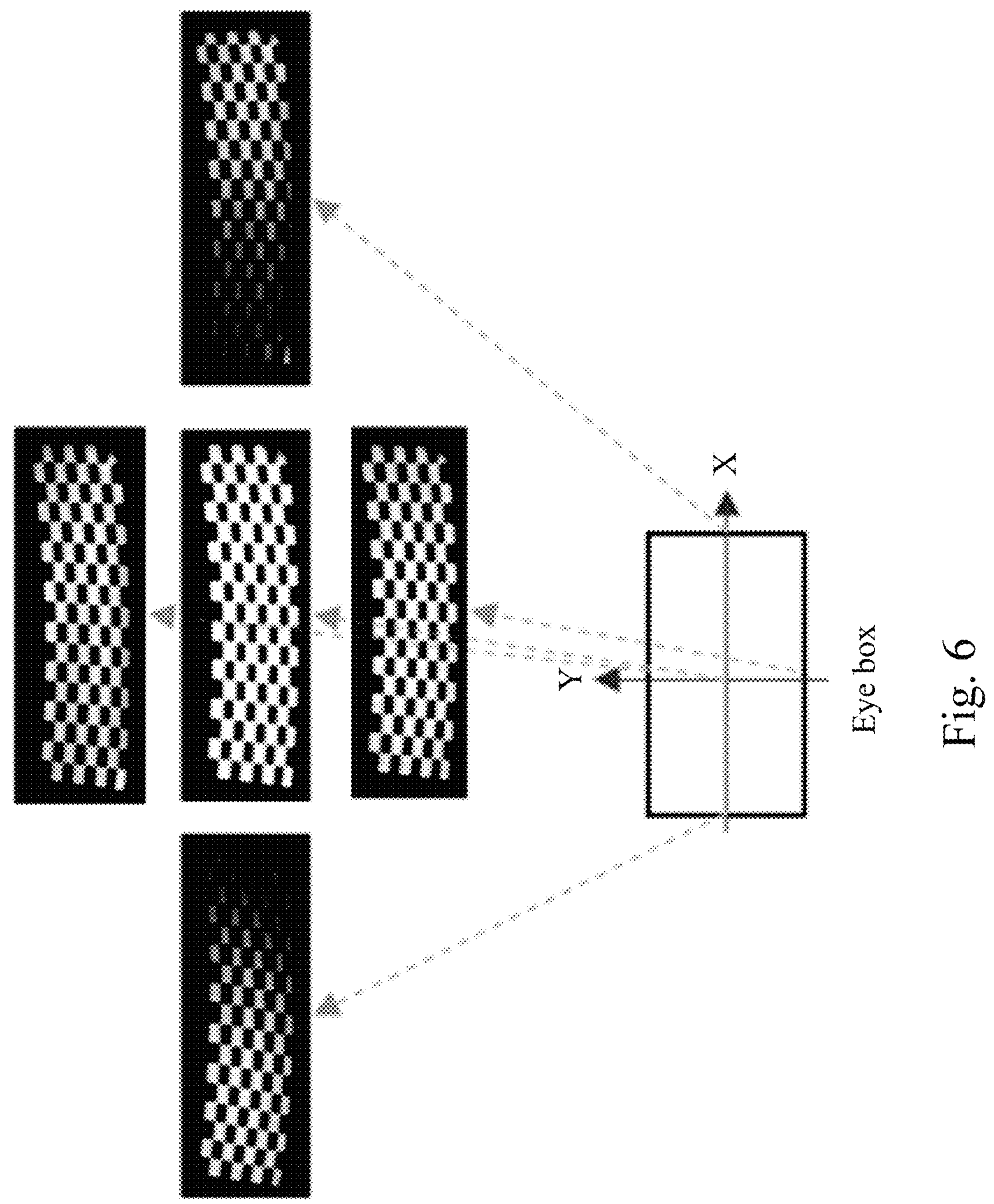
FIG. 6 shows a schematic diagram of a method of dewarping.

FIG. 6 shows a schematic diagram of a method of dewarping. Referring to FIGS. 5 and 6, the left eye image 210 and the right eye image 220 are then subjected to a dewarping algorithm. This step includes use of an eye tracking camera 130 (see FIG. 1) to provide a left eye gazing position and a right eye gazing position, where the eye tracking camera 130 finds left eye and right eye gazing coordinates throughout an entire eye box (the left eye gazing coordinates are represented by (x,y)), and feeds back the gazing coordinates to the computing unit 114. The dewarping the left eye image 210 according to the left eye gazing position satisfies $$u'(u, v, x, y) = \qquad \text{Formula 1}$$

-continued $$p_{u00}+p_{u10}u+p_{u01}v+p_{u20}u^2+p_{v11}uv+p_{u02}v^2$$

$$v'(u,v,x,y)=p_{v00}+p_{v10}u+p_{v01}v+p_{v20}u^2+p_{v11}uv+p_{v02}v^2$$

$$p_{u,v,i,j}=\sum_{n=0}^{m}\sum_{o=0}^{n}p_{o(n-o)}x^o y^{n-o},\ o,n,m\in N$$

wherein (u,v) is the coordinates of the left eye image, (u',v') is the coordinates of the dewarped left eye image, (x,y) is the coordinates of the left eye gazing position, and $p_{o(n-o)}$ is a polynomial coefficient. In Formula 1, m, n, and o are natural numbers. For example, when m is equal to 4, one coefficient $p_{v00}$ in Formula 1 can be expressed as Formula 2:

Formula 2

$$p_{v00}=p_{00}+p_{10}x+p_{01}y+p_{20}x^2+p_{11}xy+p_{02}y^2+p_{30}x^3+p_{21}x^2y+p_{12}xy^2+p_{03}y^3+p_{40}x^4+p_{31}x^3y+p_{22}x^2y^2+p_{13}xy^3+p_{04}y^4$$

That is to say, in some embodiments, the coordinates of the dewarped left eye image are related to the biquadrate of the coordinates of the left eye gazing position, but the present disclosure is not limited thereto. In some embodiments, use of a polynomial algorithm may also not be selected, instead, creation of a plurality of sets of look-up tables (LUT) in the eye box will be used, and an interpolation method is used to find desired dewarping information of gazing points.

Referring to FIG. 5, a brightness of the dewarped left eye image is then corrected according to the left eye gazing position and a brightness of the dewarped right eye image is corrected according to the right eye gazing position. In this step, the individual brightnesses of the left eye gazing position and the right eye gazing position will be recorded first, and then the brightnesses of the dewarped left eye image and the dewarped right eye image will be corrected respectively, so as to achieve an effect that final output images can be identical in brightness, therefore, no vertigo is caused.

Figure 7:
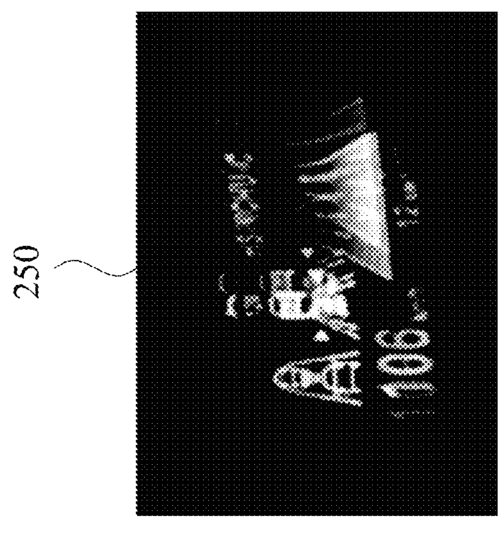
Figure 7:
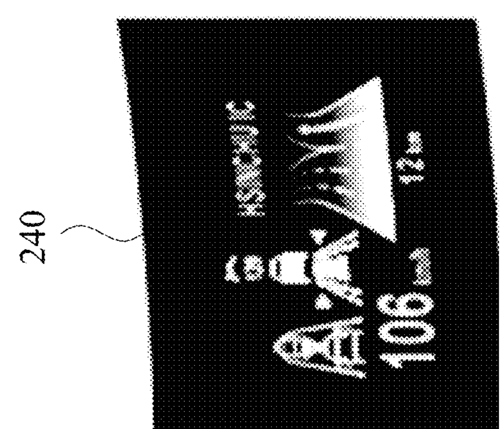
Figure 7:
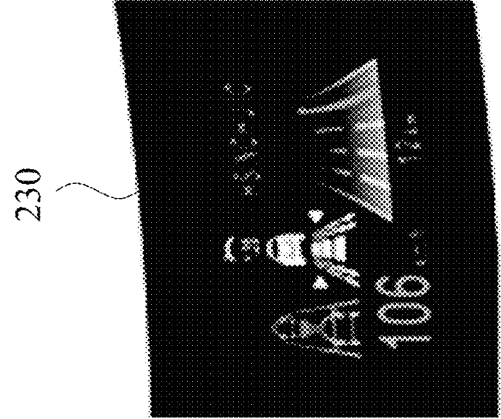

FIG. 7 and FIG. 8 show schematic diagrams of an intermediate process of the image correction method in FIG. 3. Referring to FIG. 7, the dewarped left eye image 230 and the dewarped right eye image 240 are then 3D rendered to acquire a stereoscopic left eye image and a stereoscopic right eye image. In FIG. 7, the stereoscopic left eye image and the stereoscopic right eye image are depicted as a superimposed stereoscopic image 250.

Referring to FIG. 8, the stereoscopic left eye image and the stereoscopic right eye image are then displayed via the display module 100 (see FIG. 1). The display module 100 has a cylindrical lens array 113 configured to separate the stereoscopic left eye image from the stereoscopic right eye image. After the stereoscopic left eye image is separated from the stereoscopic right eye image, the observer O will see a depth image 260 on which objects have different depths.

The foregoing outlines the features of several embodiments so that those skilled in the art may better understand the aspects of the present disclosure. Those skilled in the art should understand that they can easily use the present disclosure as a basis for designing or modifying other processes and structures to achieve the same purposes and/or to achieve the same advantages as the embodiments described herein. Those skilled in the art should also be aware that such equivalent constructions are not divorced from the spirit and scope of the present disclosure, and that, without deviating from the spirit and scope of the present disclosure, they may be subject here to various alterations, substitutions and alterations.

What is claimed is:

1. An image correction method, comprising:

providing a left eye image and a right eye image;

providing a left eye gazing position and a right eye gazing position;

dewarping the left eye image according to the left eye gazing position and dewarping the right eye image according to the right eye gazing position to acquire a dewarped left eye image and a dewarped right eye image;

correcting a brightness of the dewarped left eye image according to the left eye gazing position and correcting a brightness of the dewarped right eye image according to the right eye gazing position, such that a brightness imbalance between the dewarped left eye image and the dewarped right eye image is corrected; and 3D rendering the dewarped left eye image and the dewarped right eye image to acquire a stereoscopic left eye image and a stereoscopic right eye image.

2. The image correction method according to claim 1, wherein the dewarping the left eye image according to the left eye gazing position satisfies $$u'(u,v,x,y)=p_{u00}+p_{u10}u+p_{u01}v+p_{u20}u^2+p_{v11}uv+p_{u02}v^2$$

$$v'(u,v,x,y)=p_{v00}+p_{v10}u+p_{v01}v+p_{v20}u^2+p_{v11}uv+p_{v02}v^2$$

$$p_{u,v,i,j}=\sum_{n=0}^{m}\sum_{o=0}^{n}p_{o(n-o)}x^o y^{n-o}$$

wherein (u,v) is a coordinates of the left eye image, (u',v') is a coordinates of the dewarped left eye image, (x,y) is the coordinates of the left eye gazing position, and po(n–o) is a polynomial coefficient, m, n, and o are natural numbers, and i and j are non-negative integer indices representing mathematical powers of x and y, respectively.

3. The image correction method according to claim 1, further comprising:

providing an image; and segmenting the image into the left eye image and the right eye image.

4. The image correction method according to claim 1, wherein the providing the left eye gazing position and the right eye gazing position is implemented by using an eye tracking camera.

5. The image correction method according to claim 1, further comprising:

displaying the stereoscopic left eye image and the stereoscopic right eye image via a display module.

6. The image correction method according to claim 5, wherein the display module has a cylindrical lens array configured to separate the stereoscopic left eye image from the stereoscopic right eye image.

7. A display module, comprising:

an image generation unit, comprising:

a display;

a cylindrical lens array located on the display; and a computing unit electrically connected to the display;

a reflection unit located on the image generation unit; and an eye tracking camera located between the image generation unit and the reflection unit, electrically connected to the computing unit, and configured to provide a left eye gazing position and a right eye gazing position, wherein the computing unit is configured to dewarp a left eye image according to the left eye gazing position and dewarp a right eye image according to the right eye gazing position to acquire a dewarped left eye image and a dewarped right eye image, and wherein the computing unit is configured to correct a brightness of the dewarped left eye image according to the left eye gazing position and correct a brightness of the dewarped right eye image according to the right eye gazing position, such that a brightness imbalance between the dewarped left eye image and the dewarped right eye image is corrected.

8. The display module according to claim 7, wherein the dewarping the left eye image according to the left eye gazing position satisfies $$u'(u, v, x, y) = p_{u00} + p_{u10}u + p_{u01}v + p_{u20}u^2 + p_{v11}uv + p_{u02}v^2$$

$$v'(u, v, x, y) = p_{v00} + p_{v10}u + p_{v01}v + p_{v20}u^2 + p_{v11}uv + p_{v02}v^2$$

$$p_{u,v,i,j} = \sum_{n=0}^{m}\sum_{o=0}^{n} p_{o(n-o)}x^o y^{n-o}$$

wherein (u,v) is a coordinates of the left eye image, (u', v') is a coordinates of the dewarped left eye image, (x,y) is the coordinates of the left eye gazing position, and po(n–o) is a polynomial coefficient, m, n, and o are natural numbers, and i and j are non-negative integer indices representing mathematical powers of x and y, respectively.

9. The display module according to claim 7, further comprising:

a projection lens set located above the display.

10. The display module according to claim 7, further comprising:

an illumination module located below the display.

11. An image correction method, comprising:

segmenting an image into a left eye image and a right eye image;

providing a left eye gazing position and a right eye gazing position;

dewarping the left eye image according to the left eye gazing position and dewarping the right eye image according to the right eye gazing position to acquire a dewarped left eye image and a dewarped right eye image;

correcting a brightness of the dewarped left eye image according to the left eye gazing position and correcting a brightness of the dewarped right eye image according to the right eye gazing position, such that a brightness imbalance between the dewarped left eye image and the dewarped right eye image is corrected; and 3D rendering the dewarped left eye image and the dewarped right eye image to acquire a stereoscopic left eye image and a stereoscopic right eye image.

12. The image correction method according to claim 11, wherein the dewarping the left eye image according to the left eye gazing position satisfies $$u'(u, v, x, y) = p_{u00} + p_{u10}u + p_{u01}v + p_{u20}u^2 + p_{v11}uv + p_{u02}v^2$$

$$v'(u, v, x, y) = p_{v00} + p_{v10}u + p_{v01}v + p_{v20}u^2 + p_{v11}uv + p_{v02}v^2$$

$$p_{u,v,i,j} = \sum_{n=0}^{m}\sum_{o=0}^{n} p_{o(n-o)}x^o y^{n-o}$$

wherein (u,v) is a coordinates of the left eye image, (u',v') is a coordinates of the dewarped left eye image, (x,y) is the coordinates of the left eye gazing position, and po(n–o) is a polynomial coefficient, m, n, and o are natural numbers, and i and j are non-negative integer indices representing mathematical powers of x and y, respectively.

13. The image correction method according to claim 11, wherein the providing the left eye gazing position and the right eye gazing position is implemented by using an eye tracking camera.

14. The image correction method according to claim 11, further comprising:

displaying the stereoscopic left eye image and the stereoscopic right eye image via a display module.

15. The image correction method according to claim 14, wherein the display module has a cylindrical lens array configured to separate the stereoscopic left eye image from the stereoscopic right eye image.

* * * * *